(12) United States Patent
Lin et al.

(10) Patent No.: US 12,372,328 B2
(45) Date of Patent: Jul. 29, 2025

(54) LASER-RANGEFINDING SIGHT

(71) Applicant: ZHUHAI MEFO OPTICAL INSTRUMENTS CO LTD., Zhuhai (CN)

(72) Inventors: Dayun Lin, Zhuhai (CN); Jiyuan Tian, Zhuhai (CN); Xiping Yu, Zhuhai (CN); Hui Yang, Zhuhai (CN)

(73) Assignee: ZHUHAI MEFO OPTICAL INSTRUMENTS CO LTD., Zhuhai (CN)

( * ) Notice: Subject to any disclaimer, the term of this patent is extended or adjusted under 35 U.S.C. 154(b) by 0 days.

(21) Appl. No.: 18/625,265

(22) Filed: Apr. 3, 2024

(65) Prior Publication Data

US 2024/0263919 A1  Aug. 8, 2024

Related U.S. Application Data

(63) Continuation of application No. PCT/CN2023/091815, filed on Apr. 28, 2023.

(30) Foreign Application Priority Data

May 17, 2022 (CN) .......................... 202210535373.3

(51) Int. Cl.
  *F41G 1/473*  (2006.01)
  *F41G 1/30*   (2006.01)
  (Continued)

(52) U.S. Cl.
  CPC .............. *F41G 1/473* (2013.01); *F41G 1/30* (2013.01); *F41G 11/003* (2013.01); *G02B 5/045* (2013.01); *G02B 17/0856* (2013.01); *G02B 23/04* (2013.01)

(58) Field of Classification Search
  CPC .......... F41G 1/473; F41G 1/30; F41G 11/003; G02B 5/045; G02B 17/0856; G02B 23/04
  See application file for complete search history.

(56) References Cited

U.S. PATENT DOCUMENTS 10,281,237 B2 *  5/2019  Liang ..................... F41G 1/35
11,473,874 B2 * 10/2022  Masarik ................ G02B 27/34
(Continued)

FOREIGN PATENT DOCUMENTS

CN  201885637 U  6/2011
CN  202361892 U  8/2012
(Continued)

*Primary Examiner* — Michelle Clement
(74) *Attorney, Agent, or Firm* — Bayramoglu Law Offices LLC

(57) ABSTRACT

A sight includes a housing, a rangefinder assembly, a display screen provided in the housing and electrically connected to the rangefinder assembly, an objective lens set, an image inverter set, a reticle set, and an eyepiece set provided in the housing and sequentially arranged from an object side to an eye side, where the reticle set includes a first prism and a second prism cemented to each other, a reflective film is provided on a first cemented plane of the first prism and the second prism; the first prism has a first plane provided on an imaging plane; the second prism has a second plane perpendicular to the first plane; the first plane is provided with a reticle pattern; a light-emitting plane of the display screen is attached to the second plane; and the reflective film is configured to reflect light from the display screen to the eye side.

10 Claims, 11 Drawing Sheets

(51) Int. Cl.
*F41G 11/00* (2006.01)
*G02B 5/04* (2006.01)
*G02B 17/08* (2006.01)
*G02B 23/04* (2006.01)

(56) References Cited

U.S. PATENT DOCUMENTS

| | | | | |
|---|---|---|---|---|
| 11,474,337 | B2* | 10/2022 | Brown | G02B 27/34 |
| 11,885,591 | B2* | 1/2024 | Thomas | G02B 23/14 |
| 12,078,793 | B2* | 9/2024 | Masarik | G02B 23/14 |
| 2005/0252062 | A1 | 11/2005 | Scrogin et al. | |

FOREIGN PATENT DOCUMENTS

| | | | |
|---|---|---|---|
| CN | 102879896 | A | 1/2013 |
| CN | 203561286 | U | 4/2014 |
| CN | 105806154 | A | 7/2016 |
| CN | 206804903 | U | 12/2017 |
| CN | 207976055 | U | 10/2018 |
| CN | 113203320 | A | 8/2021 |
| CN | 113959260 | A | 1/2022 |
| CN | 114963869 | A | 8/2022 |

* cited by examiner

US 12,372,328 B2

LASER-RANGEFINDING SIGHT

CROSS REFERENCE TO THE RELATED APPLICATIONS

This application is a continuation application of International Application No. PCT/CN2023/091815, filed on Apr. 28, 2023, which is based upon and claims foreign priority to Chinese Patent Application No. 202210535373.3, filed on May 17, 2022, the entire contents of which are incorporated herein by reference.

TECHNICAL FIELD

The present application belongs to the technical field of gun sighting, and particularly relates to a sight.

BACKGROUND

Sights can be used for realizing accurate sighting to make shooting less difficult. For existing sights, a liquid crystal display (LCD) sighting display reticle with mil-dot reticle is usually provided on a focal plane of an eyepiece set. A ranging result is displayed by the LCD sighting display reticle. However, an LCD portion of the LCD sighting display reticle will inevitably obstruct a field of view (FOV). This affects sighting range and sighting accuracy, and further disperses the attention of a shooter to affect sighting operation.

SUMMARY

An embodiment of the present application is intended to provide a sight, to solve the technical problem that an LCD portion of an LCD sighting display reticle on an existing sight obstructs an FOV.

To achieve the above objective, the present application uses the following technical solutions: A sight includes a housing, a rangefinder assembly, a display screen provided in the housing and electrically connected to the rangefinder assembly, as well as an objective lens set, an image inverter set, a reticle set, and an eyepiece set provided in the housing and sequentially arranged from an object side to an eye side, where the reticle set includes a first prism and a second prism cemented to each other; a reflective film is provided on a first cemented plane of the first prism and the second prism; the first prism has a first plane provided on an imaging plane; the second prism has a second plane perpendicular to the first plane; the first plane is provided with a reticle pattern; a light-emitting plane of the display screen is attached to the second plane; and the reflective film is configured to reflect light from the display screen to the eye side.

In an embodiment, the first plane and the second plane are conjugated relative to the first cemented plane of the first prism and the second prism.

In an embodiment, the image inverter set is a prism image inverter set; the image inverter set includes a roof prism and a half-pentaprism; the roof prism has a first incident plane, a first reflecting plane, and a first exit plane; the half-pentaprism has a second incident plane, a second reflecting plane, and a second exit plane; the first incident plane faces to the object side; the first exit plane is opposite to the second incident plane; and the second exit plane faces to the eye side.

In an embodiment, the sight further includes a beam splitter prism; the beam splitter prism has a third incident plane, a third reflecting plane, and a third exit plane; the third incident plane is attached to the second reflecting plane; the second reflecting plane or the third incident plane is provided with a first beam splitting film; and the first beam splitting film is configured to reflect visible light and allow invisible light to penetrate through; and the rangefinder assembly includes a laser emitter provided outside the housing, and a laser receiver provided in the housing; and the laser receiver is opposite to the third exit plane.

In an embodiment, the objective lens set includes a starting lens closest to the object side; and an optical distance from the starting lens to the laser receiver is the same as an optical distance from the starting lens to the first plane.

In an embodiment, at least one of the first incident plane, the first exit plane, the second incident plane, the second exit plane, and the third exit plane is provided with an anti-reflective film.

In an embodiment, the image inverter set is a lens image inverter set;

the sight further includes a beam splitter prism set provided between the image inverter set and the objective lens set; the beam splitter prism set includes a third prism and a fourth prism cemented to each other; a second beam splitting film is provided on a second cemented plane of the third prism and the fourth prism; the third prism has a third plane provided on a focal plane of the object side; the fourth prism has a fourth plane perpendicular to the third plane; and the second beam splitting film is configured to allow visible light to penetrate through and reflect invisible light to the fourth plane; and the rangefinder assembly includes a laser emitter provided outside the housing, and a laser receiver provided in the housing; and the laser receiver is opposite to the fourth plane.

In an embodiment, the laser receiver is attached to the fourth plane; and the third plane and the fourth plane are conjugated relative to the second cemented plane of the third prism and the fourth prism.

In an embodiment, the sight further includes a control panel electrically connected to the display screen; a button is provided on the control panel; and the button is exposed out of the housing.

In an embodiment, the sight further includes a battery compartment; and the battery compartment includes a rechargeable battery electrically connected to the rangefinder assembly and the display screen, and a charging interface electrically connected to the rechargeable battery.

In an embodiment, the sight further includes an internal adjustment mechanism; the internal adjustment mechanism includes a ballistic adjusting bolt and an airduct adjusting bolt that are provided in the housing in a penetration manner; the ballistic adjusting bolt is provided at a side of the reticle set along a vertical direction; the ballistic adjusting bolt is configured to drive the reticle set to move vertically, thereby adjusting a ballistic compensation distance; the airduct adjusting bolt is provided at a side of the reticle set along a horizontal direction; and the airduct adjusting bolt is configured to drive the reticle set to move horizontally, thereby adjusting a windage compensation distance.

In an embodiment, the sight further includes an external adjustment mechanism provided outside the housing; the external adjustment mechanism includes a stand seat engaged to a firearm guide rail, and a stand body fixedly connected to the housing; the stand body is connected to the stand seat; the stand body can move vertically relative to the stand seat to adjust the ballistic compensation distance of the sight; and/or the stand body can move horizontally relative to the stand seat to adjust the windage compensation distance of the sight.

In an embodiment, the display screen displays a sighting point, so as to indicate an adjusting position.

The present application has the following beneficial effects:

According to the sight provided by the embodiment of the present application, the reticle set includes the first prism and the second prism cemented to each other, the imaging plane is provided on the first plane of the first prism, and the display screen is provided on the second plane perpendicular to the first plane. The display screen is skillfully provided outside a main optical path. Through the reflective film on the first cemented plane of the first prism and the second prism, parameter information displayed by the display screen is superimposed with an erect target image on the first plane and the reticle pattern. Therefore, the present application not only ensures a sighting definition, but also does not cause obstruction to the FOV, and particularly prevents the display screen from obstructing the FOV, thereby ensuring an FOV integrity, a sighting range and a sighting accuracy. The present application facilitates a sighting operation of a shooter, and particularly facilitates attention concentration, environment observation, as well as quick sighting in movement of the shooter. That is, the present application makes sighting more comfortable.

BRIEF DESCRIPTION OF THE DRAWINGS

To describe the technical solutions in the embodiments of the present application more clearly, the drawings required for describing the embodiments or the prior art are described briefly below. Apparently, the drawings in the following description merely show some embodiments of the present application, and those of ordinary skill in the art may still derive other drawings from these drawings without creative efforts.

In the figures.

Figure 1:
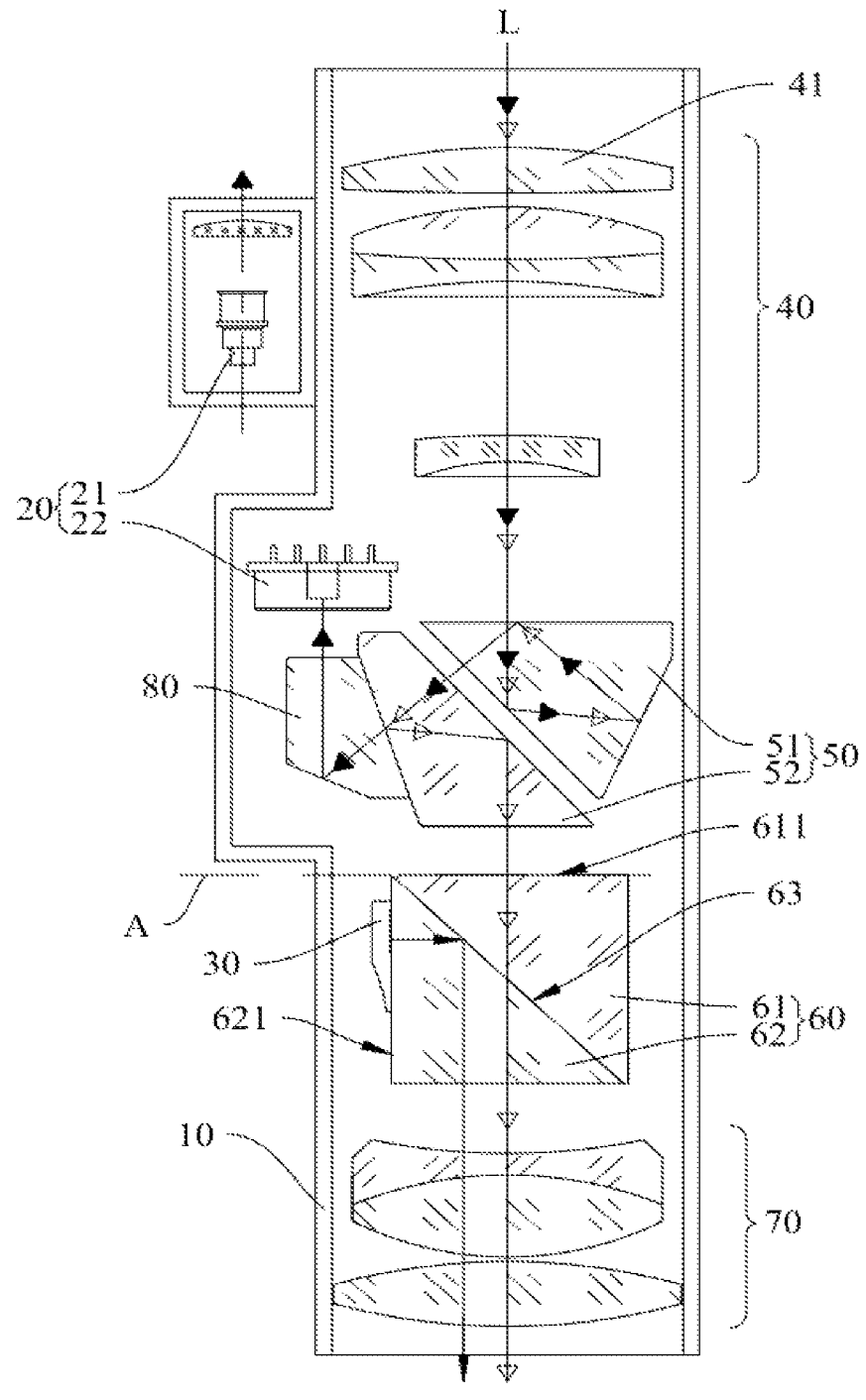
FIG. 1 is a structural schematic view of a sight according to Embodiment 1 of the present application.

10—housing, 20—rangefinder assembly, 21—laser emitter, 22—laser receiver, 30—display screen, 31—parameter information, 32—sighting point, 40—objective lens set, 41—starting lens, 50—image inverter set, 51—roof prism, 511—first incident plane, 512—first reflecting plane, 513—first exit plane, 52—half-pentaprism, 521—second incident plane, 522—second reflecting plane, 523—second exit plane, 60—reticle set, 61—first prism, 611—first plane, 612—reticle pattern, 62—second prism, 621—second plane, 63—first cemented plane, 70—eyepiece set, 80—beam splitter prism, 81—third incident plane, 82—third reflecting plane, 83—third exit plane, 90—beam splitter prism set, 91—third prism, 911—third plane, 92—fourth prism, 921—fourth plane, 93—second cemented plane, 100—battery compartment, 101—rechargeable battery, 102—charging interface, 110—internal adjustment mechanism, 111—ballistic adjusting bolt, 112—airduct adjusting bolt, L—principal optical axis, A—imaging plane, and B—focal plane of object side.

DETAILED DESCRIPTION OF THE EMBODIMENTS

To make the to-be-resolved technical problems, technical solutions and beneficial effects of the present application clearer, the present application is described in further detail below with reference to the drawings and embodiments. It should be understood that the specific embodiments described herein are merely intended to explain the present application, rather than to limit the present application.

In the description of the present application, it needs to be understood the orientation or positional relationships indicated by terms, such as "length", "width", "upper", "lower", "front", "rear", "left", "right", "vertical", "horizontal", "top", "bottom", "inside", and "outside", are based on the orientation or positional relationship shown in the accompanying drawings, are merely for facilitating the description of the present application and simplifying the description, rather than indicating or implying that an apparatus or element referred to must have a particular orientation or be constructed and operated in a particular orientation, and therefore shall not be interpreted as limiting the present application.

In addition, the terms "first" and "second" are merely intended for a purpose of description, and shall not be understood as an indication or implication of relative importance or implicit indication of a quantity of indicated technical features. Thus, features defined with "first" and "second" may explicitly or implicitly include one or more of the features. In the description of the present application, "multiple" means two or more, unless otherwise specifically defined.

In the present application, unless otherwise clearly specified, the terms such as "mounting", "interconnection", "connection" and "fixation" are intended to be understood in a broad sense. For example, the "connection" may be a fixed connection, removable connection or integral connection; may be a mechanical connection or electrical connection; may be a direct connection or indirect connection via a medium; and may be a communication or interaction between two elements. Those of ordinary skill in the art may understand body specific meanings of the above terms in the present application based on specific situations.

In the present application, the term "eye side" refers to an end of the sight close to a shooter in an actual operation, and the term "object side" refers to an end of the sight close to a target in the actual operation, namely an end away from the shooter.

Sights can be used for realizing accurate sighting to make shooting less difficult. For existing sights, an LCD sighting display reticle with mil-dot reticle is usually provided on a focal plane of an eyepiece set. A ranging result is displayed by the LCD sighting display reticle. However, the LCD sighting display reticle is provided between an objective lens set and the eyepiece set. An LCD portion of the LCD sighting display reticle is inevitable to obstruct an FOV. This affects a sighting range and a sighting accuracy, does not facilitate observation of the shooter for an environment and quick sighting in movement, and further disperses an attention of the shooter to affect a sighting operation.

In addition, in order to reduce an obstructed area of the FOV, the LCD portion of the LCD sighting display reticle on the existing sight is reduced as much as possible, such that the LCD sighting display reticle basically can only display distance parameter information, with a single function.

Therefore, an embodiment of the present application provides a sight. The sight not only has a full FOV, but also can display more parameter information as required, for example, the parameter information including a distance, a battery level, a temperature, and an air velocity.

The specific implementation of the present application is described in detail below with reference to specific embodiments.

Embodiment 1

Figure 2:
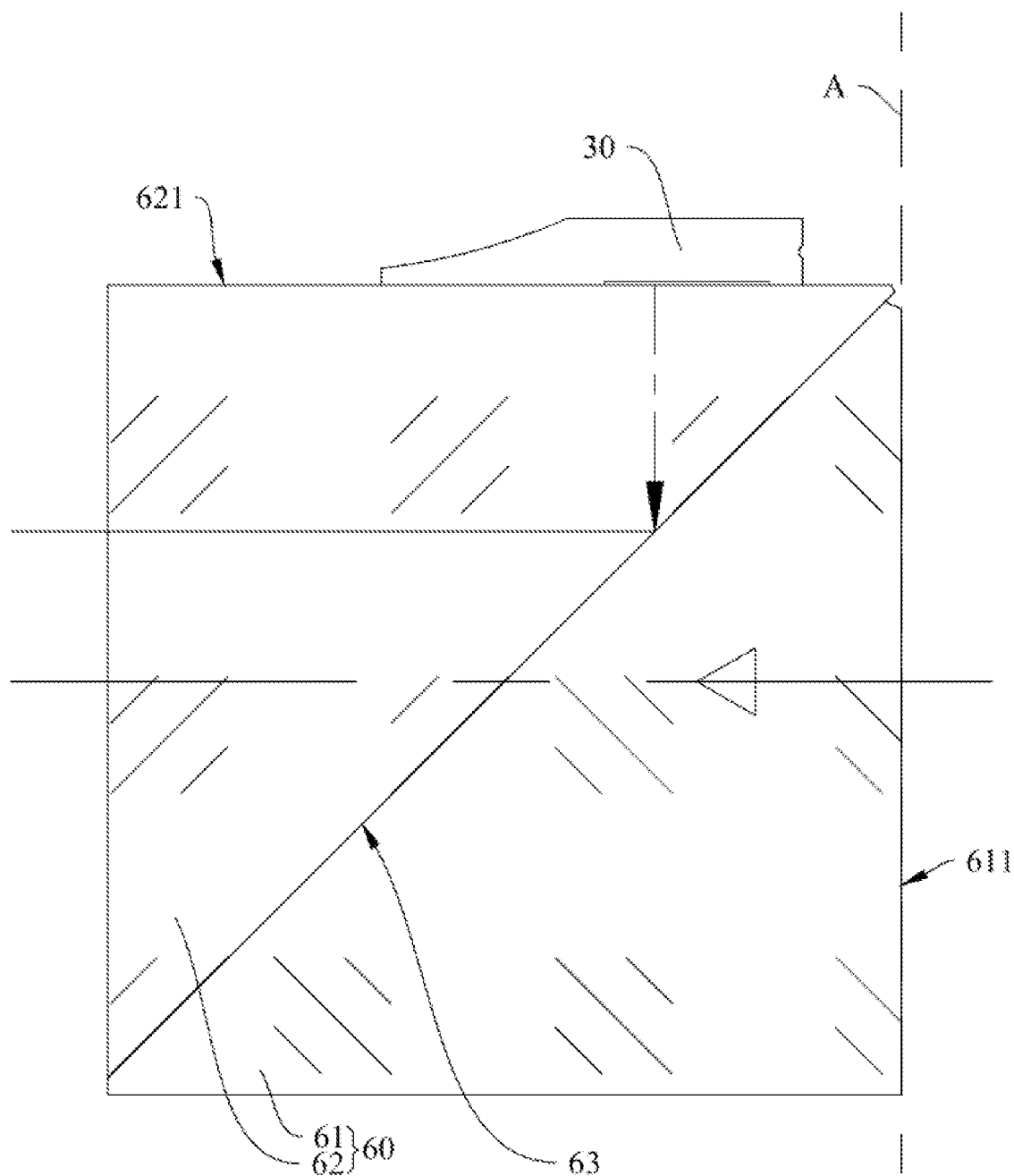
FIG. 2 is a first structural schematic view of a reticle set and a display screen according to Embodiment 1 of the present application.
Figure 3:
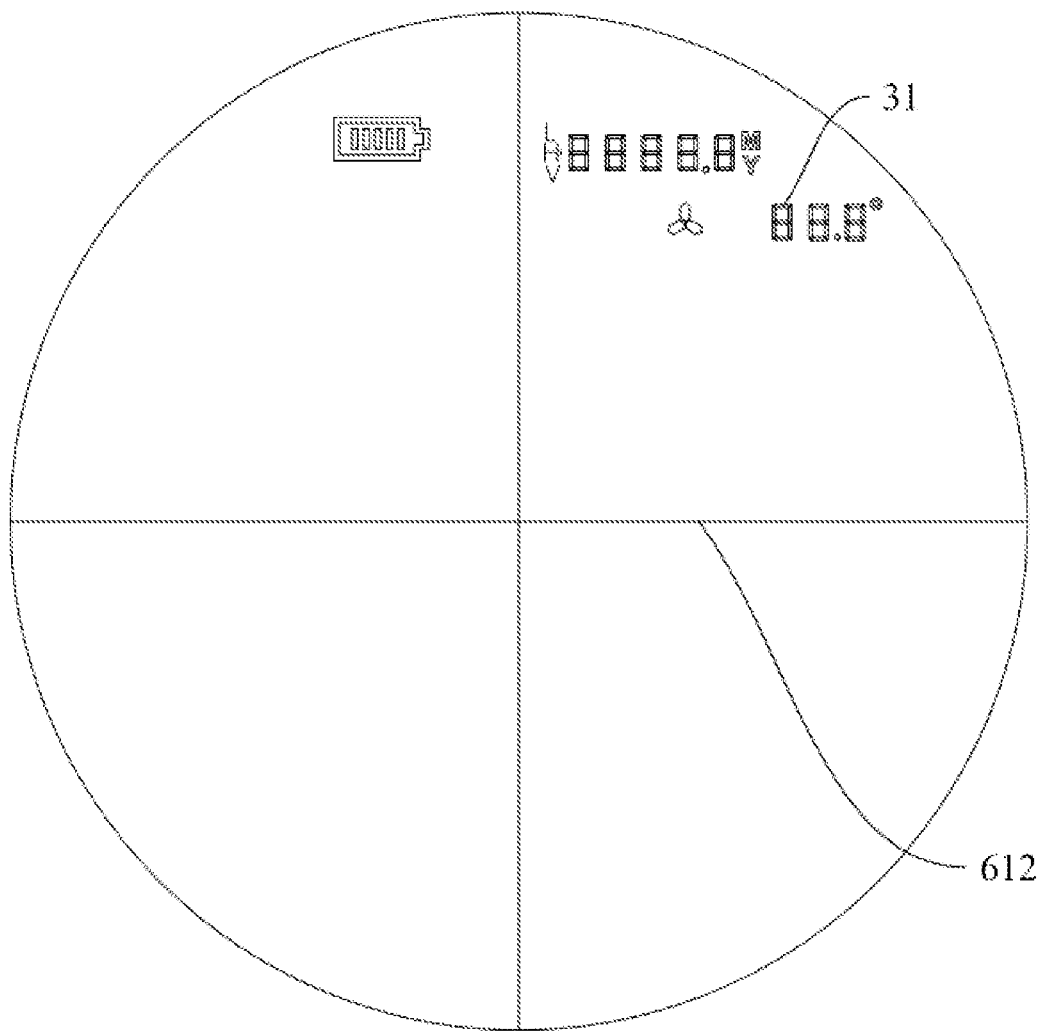
FIG. 3 is a schematic view of an FOV corresponding to FIG. 2.

Referring to FIG. 1, FIG. 2, and FIG. 3, an embodiment of the present application provides a sight, including housing 10, rangefinder assembly 20, display screen 30 provided in the housing 10 and electrically connected to the rangefinder assembly 20, as well as objective lens set 40, image inverter set 50, reticle set 60, and eyepiece set 70 provided in the housing 10 and sequentially arranged from an object side to an eye side. The reticle set 60 includes first prism 61 and second prism 62 cemented to each other. A reflective film is provided on first cemented plane 63 of the first prism 61 and the second prism 62. The first prism 61 has first plane 611 provided on imaging plane A. The second prism 62 has second plane 621 perpendicular to the first plane 611. The first plane 611 is provided with reticle pattern 612. A light-emitting plane of the display screen 30 is attached to the second plane 621. The reflective film is configured to reflect light from the display screen 30 to the eye side.

It is to be noted that the housing 10 is configured to reliably protect each structure in the housing 10. There are no limits made on a size, a shape, a material and the like of the housing 10.

The rangefinder assembly 20 is configured to measure a distance from a target to the sight (or a shooter), and feed measured distance parameter information 31 back to the display screen 30 electrically connected to the rangefinder assembly 20. In the embodiment, the rangefinder assembly 20 may be a laser rangefinder assembly. The rangefinder assembly 20 may include laser emitter 21 and laser receiver 22. The laser emitter 21 may be provided outside the housing 10, and configured to emit invisible light (such as infrared light) with a specific wavelength to the target to distinguish from environment visible light. The laser receiver 22 may be provided in the housing 10, and configured to receive the invisible light with the specific wavelength reflected from the target. Therefore, there is a time difference between emission of the invisible light with the specific wavelength from the laser emitter 21 to reception of the laser receiver 22. The invisible light has a fixed propagation velocity in air. In view of the time difference and the propagation velocity, the distance from the target to the sight (or the shooter) is measured. The measurement process may be handled by a microcontroller unit (MCU), but is not limited thereto. Certainly, in other possible implementations, the rangefinder assembly 20 may also be the rangefinder assembly 20 in other forms, which is not limited in the embodiment.

The display screen 30 may be, but is not limited to, an LCD. The display screen 30 is at least configured to acquire and display the distance parameter information 31 measured by the rangefinder assembly 20. Certainly, in the embodiment, the display screen 30 may further display more parameter information 31 as required, for example, the parameter information 31 including a battery level, a temperature, and an air velocity.

The objective lens set 40 is provided at an end side of the sight close to the object side, and configured to receive external light. There are no limits made on a specific structure of the objective lens set 40.

The image inverter set 50 is provided between the objective lens set 40 and the reticle set 60, and configured to correct an upside-down and left-right inverted image of the objective lens set 40 as an erect image. The corrected erect image is formed on the imaging plane A, namely on the first plane 611.

The eyepiece set 70 is provided at an end side of the sight close to the eye side, and configured to further amplify a final image (including the coincident, superimposed and projected erect image, the reticle pattern 612 and the displayed parameter information 31), and transmit a resulting image to a human eye. There are no limits made on a specific structure of the eyepiece set 70.

It is further to be noted that the reticle set 60 is provided between the image inverter set 50 and the eyepiece set 70. The reticle set 60 includes the first prism 61 and the second prism 62 cemented to each other.

The first cemented plane 63 of the first prism 61 and the second prism 62 is inclined relative to principal optical axis L, and is provided with the reflective film. The reflective film is configured to reflect light with a specific wavelength and allow light with other wavelengths to penetrate through. Specifically, the reflective film is configured to reflect light emitted by the display screen 30 to the eye side, and allow the light from the first plane 611 to penetrate through and transmit to the eye side. The reflective film may be provided on the first cemented plane 63 of the first prism 61 or the first cemented plane 63 of the second prism 62 in a manner including but not limited to coating.

The first plane 611 of the first prism 61 is perpendicular to the principal optical axis L of the sight, and engraved with the reticle pattern 612. There are no limits made on a specific pattern of the reticle pattern 612. The reticle pattern 612 may be provided with a horizontal reference line, a vertical reference line, an equidistant scale line, and the like that are perpendicular to each other and intersected to each other. In view of this, when the visible light reaches the imaging plane A of the reticle set 60, namely the first plane 611, and forms a clear erect image, the visible light can continuously penetrate through the reflective film to transmit to the eye side. Consequently, coincident and projected erect image and the reticle pattern 612 can be observed in an FOV by the human eye.

The second plane 621 of the second prism 62 is parallel to the principal optical axis L, and attached to the light-emitting plane of the display screen 30. In view of this, when the display screen 30 facing to the second plane 621 displays the parameter information 31 including the distance, light emitted by the display screen 30 can be reflected by the reflective film to the eye side. Consequently, the coincident and projected erect image, the reticle pattern 612, and the parameter information 31 displayed by the display screen 30 can be observed in the FOV by the human eye. This does not cause obstruction to the FOV to facilitate realization of the sighting function.

Figure 4:
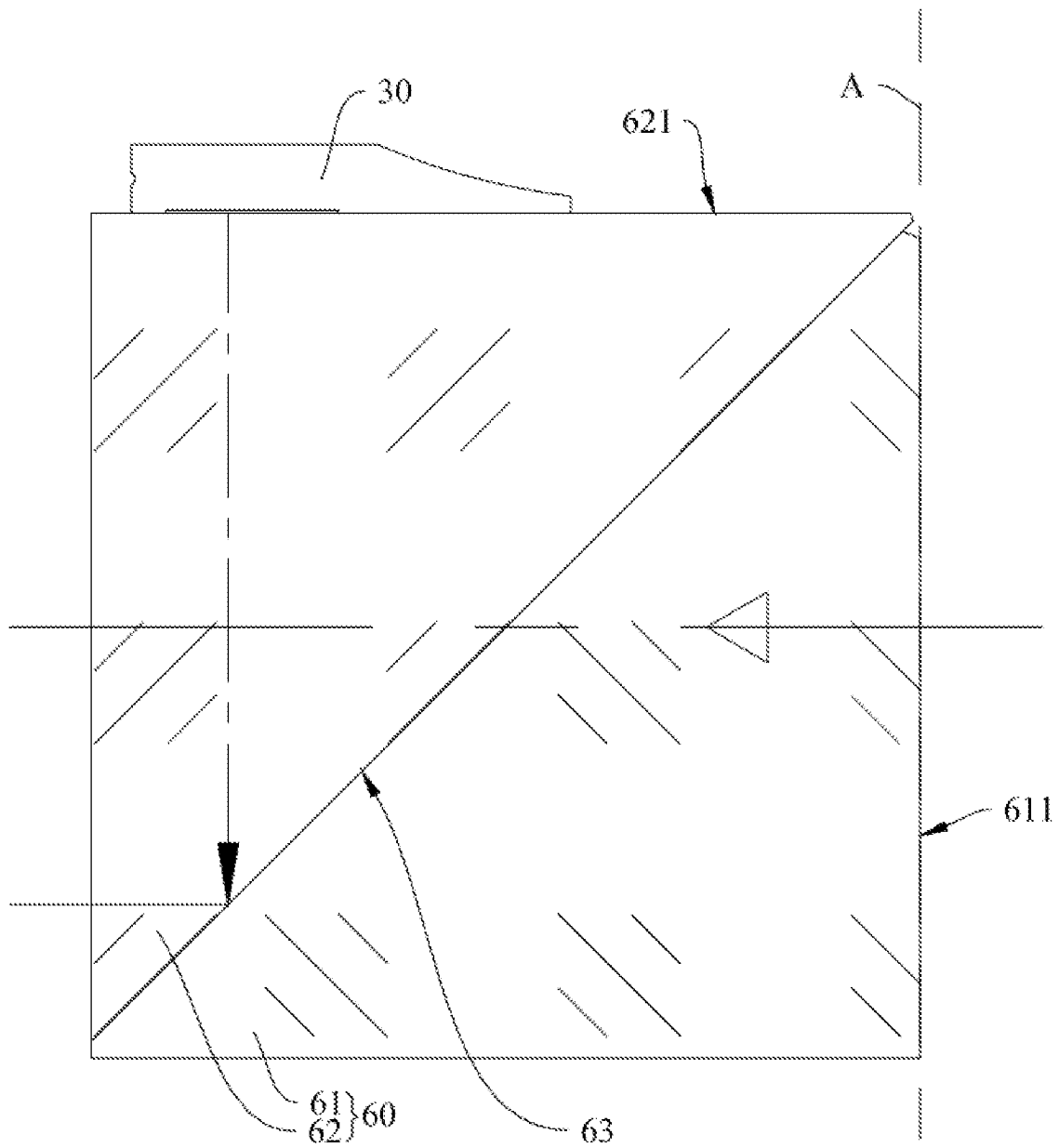
FIG. 4 is a second structural schematic view of a reticle set and a display screen according to Embodiment 1 of the present application.
Figure 5:
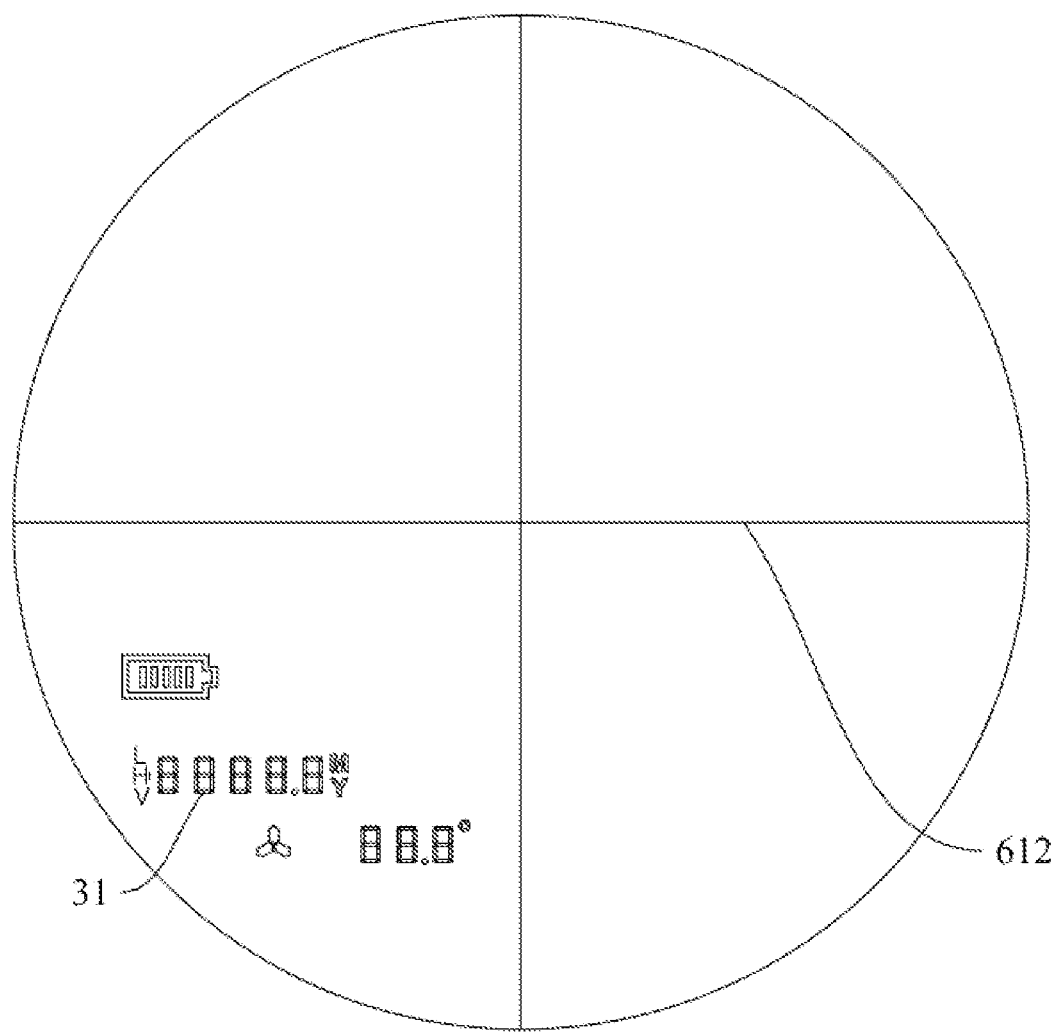
FIG. 5 is a schematic view of an FOV corresponding to FIG. 4.

A position of a displayed content of the display screen 30 in the FOV can be changed by adjusting a position of the display screen 30 on the second plane 621. Exemplarily, when the display screen 30 is placed as shown in FIG. 2, an image formed by the displayed content of the display screen 30 in the FOV is as shown in FIG. 3. When the display screen 30 is placed as shown in FIG. 4, an image formed by the displayed content of the display screen 30 in the FOV is as shown in FIG. 5.

To sum up, the sight provided by the embodiment of the present application basically has the following working principle: The laser emitter 21 of the rangefinder assembly 20 emits invisible light with a specific wavelength to a target. The invisible light with the specific wavelength is reflected by the target, and enters the objective lens set 40 together with environment visible light. Sequentially passing through the objective lens set 40 and the image inverter set 50, the visible light reaches the imaging plane A of the reticle set 60, namely the first plane 611, to form a clear erect image. The clear erect image continues to pass through the reflective film of the reticle set 60, and finally exits from the eyepiece set 70 to enter the human eye. Meanwhile, the invisible light with the specific wavelength is propagated along a preset path, until it is received by the laser receiver 22 of the rangefinder assembly 20. The rangefinder assembly 20 measures a distance from the target to the sight or the shooter, and feeds measured distance parameter information 31 back to the display screen 30 electrically connected to the rangefinder assembly 20. The display screen 30 displays the parameter information 31 including the distance to the second plane 621. Light emitted by the display screen 30 can be reflected to the eye side through the reflective film, and exits from the eyepiece set 70 together with the visible light to enter the human eye. So far, the clear erect target image, the reticle pattern 612, and the parameter information 31 displayed by the display screen 30 can be observed in the full FOV by the human eye. This does not cause obstruction to the FOV, and particularly prevents the display screen 30 from obstructing the FOV.

Therefore, compared with the prior art, according to the sight provided by the embodiment of the present application, the reticle set 60 includes the first prism 61 and the second prism 62 cemented to each other, the imaging plane A is provided on the first plane 611 of the first prism 61, and the display screen 30 is provided on the second plane 621 perpendicular to the first plane 611. The display screen 30 is skillfully provided outside a main optical path. Through the reflective film on the first cemented plane 63 of the first prism 61 and the second prism 62, parameter information 31 displayed by the display screen 30 is superimposed with an erect target image on the first plane 611 and the reticle pattern 612. Therefore, the present application not only ensures a sighting definition, but also does not cause obstruction to the FOV, and particularly prevents the display screen 30 from obstructing the FOV, thereby ensuring an FOV integrity, a sighting range and a sighting accuracy. The present application facilitates a sighting operation of the shooter, and particularly facilitates attention concentration, environment observation, as well as quick sighting in movement of the shooter. That is, the present application makes sighting more comfortable.

In addition, since the display screen 30 does not cause the obstruction to the FOV, the sight provided by the embodiment of the present application unnecessarily reduces an area of the display screen 30 compared with the prior art. The display screen 30 can display more parameter information 31 as required, for example, the parameter information 31 including a distance, a battery level, a temperature, and an air velocity, thereby enriching a function and operational performance of the sight.

Referring to FIG. 1, FIG. 2, and FIG. 3, in the embodiment, the first plane 611 and the second plane 621 are conjugated relative to the first cemented plane 63 of the first prism 61 and the second prism 62. That is, optical distances from any point on the first cemented plane 63 to the first plane 611 and the second plane 621 are the same. In other words, an optical distance from any point on the first cemented plane 63 to the first plane 611 is the same as an optical distance from the point to the second plane 621.

With the above solution, it can be ensured that an optical distance of the light emitted by the display screen 30 from the second plane 621 to the human eye is the same as an optical distance of the visible light from the imaging plane A, namely the first plane 611, to the human eye. That is, the light emitted by the display screen 30 and the visible light reach the human eye at the same time. Consequently, the clear erect target image, the clear reticle pattern 612, as well as the parameter information 31 including the distance displayed by the display screen 30 in real time, can be observed by the human eye in the full FOV. Meanwhile, the displayed parameter information 31 superimposed on the erect target image and the reticle pattern 612 and observed from the eye side is as clear as the erect target image and the reticle pattern 612.

Figure 6:
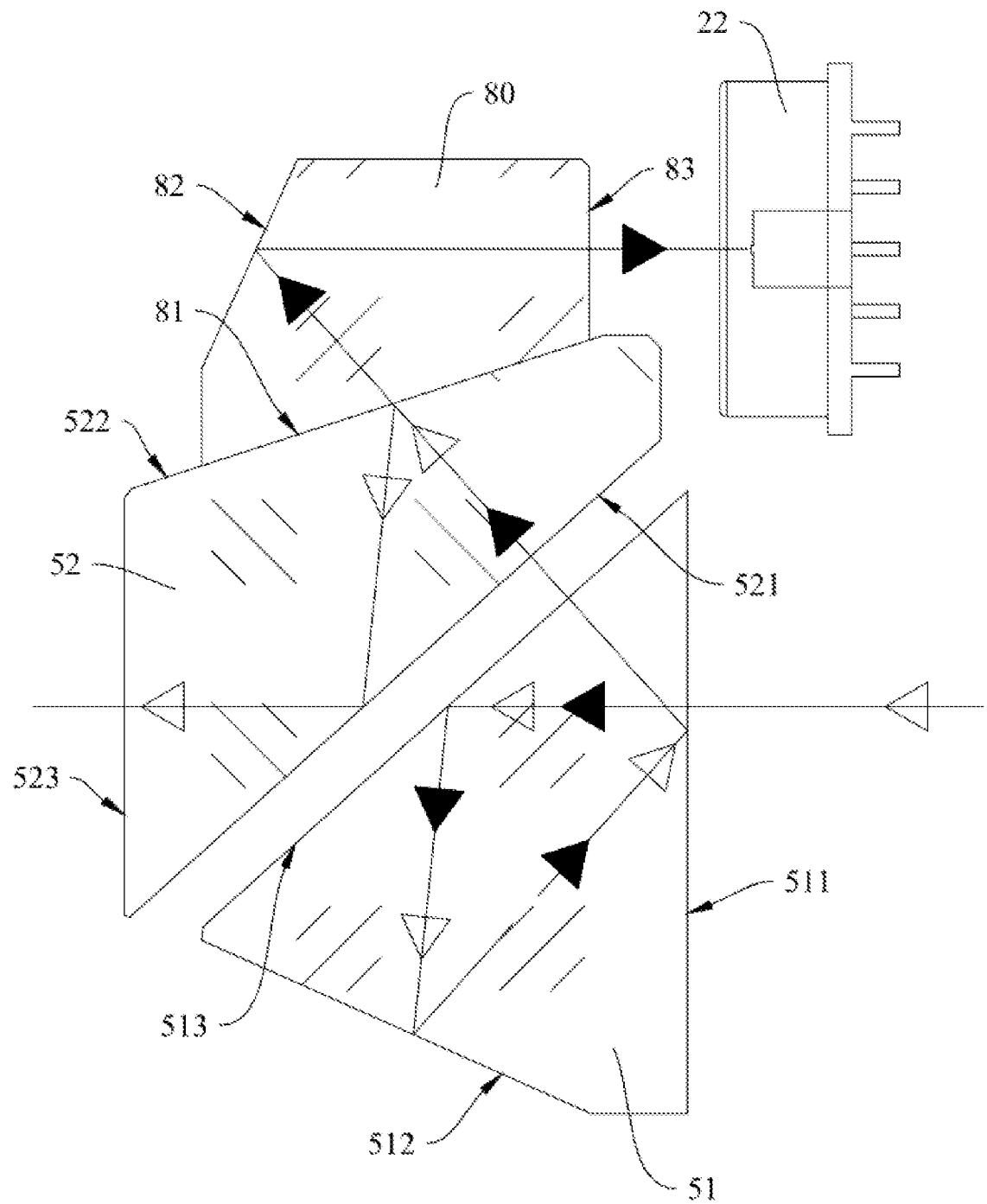
FIG. 6 is a structural schematic view of an image inverter set, a beam splitter prism and a laser receiver according to Embodiment 1 of the present application.

Referring to FIG. 1 and FIG. 6, in the embodiment, the image inverter set 50 is a prism image inverter set that cannot be zoomed. That is, the embodiment is applied to a prism image-inverting optical system. The prism image inverter set can rotate an inverted image of the object side by 180° and correct it as an erect image on the imaging plane A, namely the first plane 611.

The image inverter set 50 includes roof prism 51 and half-pentaprism 52. The roof prism 51 has first incident plane 511, first reflecting plane 512, and first exit plane 513. The half-pentaprism 52 has second incident plane 521, second reflecting plane 522, and second exit plane 523. The first incident plane 511 faces to the object side. The first exit plane 513 is opposite to the second incident plane 521. The second exit plane 523 faces to the eye side.

The first reflecting plane 512 is configured to reflect light of all wavelengths.

The second reflecting plane 522 is at least configured to reflect the visible light.

Specifically, when the visible light passes through the objective lens set 40 and vertically enters the first incident plane 511 of the roof prism 51, the visible light can be reflected repeatedly by the first reflecting plane 512 and the first exit plane 513, until it vertically exits the first exit plane 513 and vertically enters the second incident plane 521 of the half-pentaprism 52. Thereafter, the visible light can be reflected repeatedly by the second reflecting plane 522 and the second incident plane 521, until it vertically exits the second exit plane 523. Then, the visible light can reach the imaging plane A of the reticle set 60, namely the first plane 611, and form the clear erect image.

In a possible implementation, the laser receiver 22 of the rangefinder assembly 20 may be provided on a path of the light exiting from the second exit plane 523 of the half-pentaprism 52. In order to prevent the laser receiver 22 from obstructing the imaging plane A of the reticle set 60, namely the first plane 611, the laser receiver 22 may be provided side by side with the imaging plane A of the reticle set 60, namely the first plane 611. In view of this, the invisible light with the specific wavelength reflected by the target has a same propagation path with the visible light. Through the objective lens set 40 and the image inverter set 50, the invisible light with the specific wavelength enters the laser receiver 22, and is received by the laser receiver 22. Therefore, in the implementation, the laser receiver 22 can also receive the invisible light with the specific wavelength reflected by the target. However, this causes a huge size of the sight.

In view of the above problem, referring to FIG. 1 and FIG. 6, in the embodiment, the sight further includes beam splitter prism 80. The beam splitter prism 80 has third incident plane 81, third reflecting plane 82, and third exit plane 83. The third incident plane 81 is attached to the second reflecting plane 522. The second reflecting plane 522 is provided with a first beam splitting film. The first beam splitting film is configured to reflect visible light and allow invisible light to penetrate through. The rangefinder assembly 20 includes laser emitter 21 provided outside the housing 10, and laser receiver 22 provided in the housing 10. The laser receiver 22 is opposite to the third exit plane 83.

The first beam splitting film may be provided on the second reflecting plane 522 in a manner including but not limited to coating. The first beam splitting film is configured to reflect the visible light, and allow the invisible light with a specific wavelength to penetrate through.

The third reflecting plane 82 is configured to reflect the invisible light with the specific wavelength.

Specifically, when the invisible light with the specific wavelength passes through the objective lens set 40 and vertically enters the first incident plane 511 of the roof prism 51, the invisible light with the specific wavelength can be reflected repeatedly by the first reflecting plane 512 and the first exit plane 513, until it vertically exits the first exit plane 513 and vertically enters the second incident plane 521 of the half-pentaprism 52. Thereafter, the invisible light with the specific wavelength can be separated from the visible light through the first beam splitting film, and enters the third incident plane 81. Then, the invisible light with the specific wavelength can be reflected by the third reflecting plane 82, vertically exits the third exit plane 83, and is received by the laser receiver 22 opposite to the third exit plane 83. So far, in view of a time difference between emission of the invisible light with the specific wavelength from the laser emitter 21 to reception of the laser receiver 22, as well as a propagation velocity of the invisible light in air, the rangefinder assembly 20 measures a distance from the target to the sight (or the shooter).

Therefore, in the embodiment, the invisible light with the specific wavelength is separated from the visible light through the first beam splitting film, and the invisible light with the specific wavelength is deflected by the beam splitter prism 80, such that the invisible light with the specific wavelength is propagated according to a preset path and deflected to the laser receiver 22. This can effectively shorten a propagation path of the invisible light with the specific wavelength, and can optimize a layout of the laser receiver 22 in the housing 10, thereby reducing the size of the sight, and facilitating miniaturization of the sight.

Referring to FIG. 1, in the embodiment, the objective lens set 40 includes starting lens 41 closest to the object side (namely a first lens of the objective lens set 40). An optical distance from the starting lens 41 to the laser receiver 22 is the same as an optical distance from the starting lens 41 to the first plane 611.

With the above solution, the optical distance of the invisible light with the specific wavelength from the starting lens 41 to the laser receiver 22 is the same as the optical distance of the visible light from the starting lens 41 to the first plane 611. That is, while the visible light reaches the imaging plane A, namely the first plane 611, for imaging, the invisible light with the specific wavelength can reach the laser receiver 22, and is focused at a receiving port of the laser receiver 22 for imaging. This can effectively improve a timeliness and an accuracy of the distance measured by the rangefinder assembly 20.

Referring to FIG. 1 and FIG. 6, in the embodiment, at least one of the first incident plane 511, the first exit plane 513, the second incident plane 521, the second exit plane 523, and the third exit plane 83 is provided with an anti-reflective film. Specifically, some or all of the first incident plane 511, the first exit plane 513, the second incident plane 521, the second exit plane 523, and the third exit plane 83 may be provided with the anti-reflective film.

With the above solution, some or all of the first incident plane 511, the first exit plane 513, the second incident plane 521, the second exit plane 523, and the third exit plane 83 may be provided with the anti-reflective film. The anti-reflective film reduces a risk of reflection when the light vertically passes through the corresponding plane, and thus can improve a penetration rate of the light.

Referring to FIG. 1, in the embodiment, the sight further includes a control panel (not shown in the figure) electrically connected to the display screen 30. A button (not shown in the figure) is provided on the control panel. The button is exposed out of the housing 10.

There may be one or more buttons. Different buttons may meet different control functions.

The button may be a button for controlling on and off of the display screen 30. When ranging is required, the display screen 30 is turned on to obtain a target distance in real time. When the ranging is not required, the display screen 30 can be turned off to save energy consumption.

Alternatively, the button may further be a button for controlling a luminance of the display screen 30. When the target is located in an environment with a high luminance, the luminance of the display screen 30 is increased. When the target is located in an environment with a low luminance, the luminance of the display screen 30 is lowered to expand an applied environment of the sight.

Certainly, in other possible implementations, the button may further be a button with other control functions, which is not limited in the embodiment.

Embodiment 2

The embodiment differs from Embodiment 1 in:

Referring to FIG. 1 and FIG. 6, in the embodiment, the sight further includes beam splitter prism 80. The beam splitter prism 80 has third incident plane 81, third reflecting plane 82, and third exit plane 83. The third incident plane 81 is attached to the second reflecting plane 522. The third incident plane 81 is provided with a first beam splitting film. The first beam splitting film is configured to reflect visible light and allow invisible light to penetrate through. The rangefinder assembly 20 includes laser emitter 21 provided outside the housing 10, and laser receiver 22 provided in the housing 10. The laser receiver 22 is opposite to the third exit plane 83.

The first beam splitting film may be provided on the third incident plane 81 in a manner including but not limited to coating. The first beam splitting film is configured to reflect the visible light, and allow the invisible light with a specific wavelength to penetrate through. That is, the function of the second reflecting plane 522 for reflecting the visible light is realized by the first beam splitting film on the third incident plane 81.

The third reflecting plane 82 is configured to reflect the invisible light with the specific wavelength.

Specifically, when the invisible light with the specific wavelength passes through the objective lens set 40 and vertically enters the first incident plane 511 of the roof prism 51, the invisible light with the specific wavelength can be reflected repeatedly by the first reflecting plane 512 and the first exit plane 513, until it vertically exits the first exit plane 513 and vertically enters the second incident plane 521 of the half-pentaprism 52. Thereafter, the invisible light with the specific wavelength can be separated from the visible light through the first beam splitting film, and enters the third incident plane 81. Then, the invisible light with the specific wavelength can be reflected by the third reflecting plane 82, vertically exits the third exit plane 83, and is received by the laser receiver 22 opposite to the third exit plane 83. So far, in view of a time difference between emission of the invisible light with the specific wavelength from the laser emitter 21 to reception of the laser receiver 22, as well as a propagation velocity of the invisible light in air, the rangefinder assembly 20 measures a distance from the target to the sight (or the shooter).

Therefore, in the embodiment, the invisible light with the specific wavelength is separated from the visible light through the first beam splitting film, and the invisible light with the specific wavelength is deflected by the beam splitter prism 80, such that the invisible light with the specific wavelength is propagated according to a preset path and deflected to the laser receiver 22. This can effectively shorten a propagation path of the invisible light with the specific wavelength, and can optimize a layout of the laser receiver 22 in the housing 10, thereby reducing the size of the sight, and facilitating miniaturization of the sight.

Embodiment 3

Figure 7:
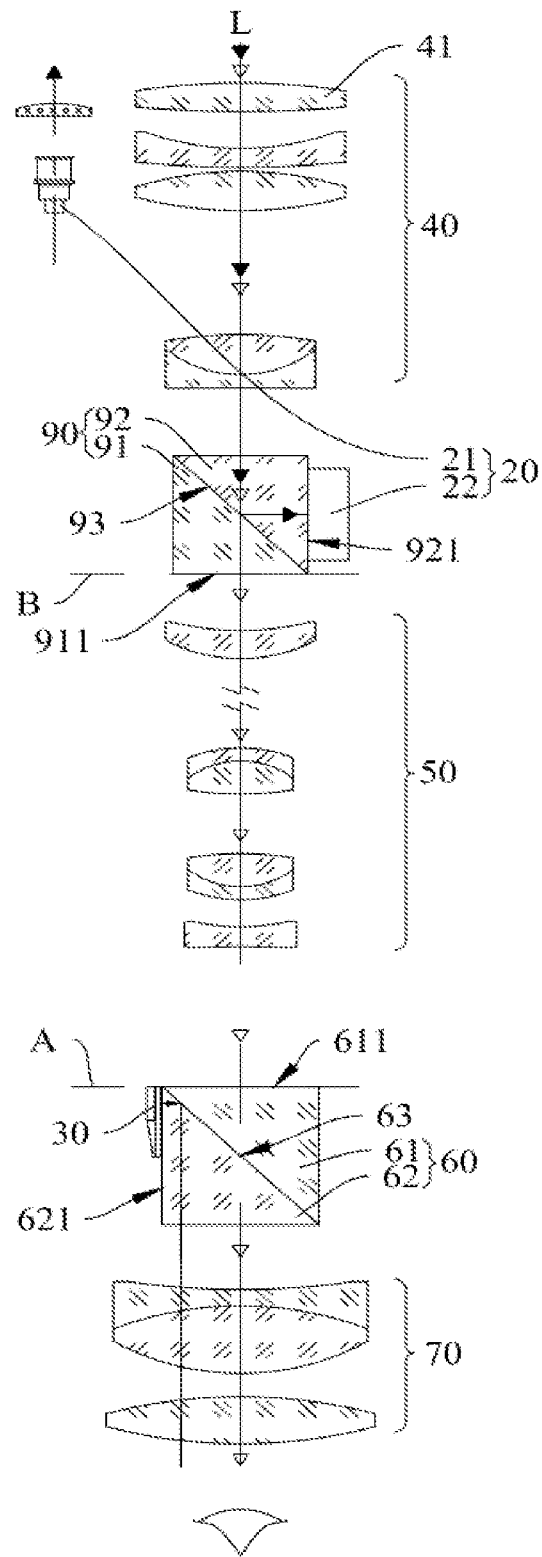
FIG. 7 is a structural schematic view of a sight according to Embodiment 3 of the present application.

The embodiment differs from Embodiment 1 in:

Referring to FIG. 7 and FIG. 3, in the embodiment, the image inverter set 50 is a prism image inverter set that can be zoomed. There are no limits made on a specific structure of the lens image inverter set. The embodiment is applied to a lens image-inverting optical system.

The sight further includes beam splitter prism set 90 provided between the image inverter set 50 and the objective lens set 40. The beam splitter prism set 90 includes third prism 91 and fourth prism 92 cemented to each other. A second beam splitting film is provided on second cemented plane 93 of the third prism 91 and the fourth prism 92. The third prism 91 has third plane 911 provided on focal plane B of the object side. The fourth prism 92 has fourth plane 921 perpendicular to the third plane 911. The second beam splitting film is configured to allow visible light to penetrate through and reflect invisible light to the fourth plane 921. The rangefinder assembly 20 includes laser emitter 21 provided outside the housing 10, and laser receiver 22 provided in the housing 10. The laser receiver 22 is opposite to the fourth plane 921.

It is to be noted that the beam splitter prism set 90 is provided between the image inverter set 50 and the objective lens set 40. The beam splitter prism set 90 includes the third prism 91 and the fourth prism 92 cemented to each other.

The second cemented plane 93 of the third prism 91 and the fourth prism 92 is inclined relative to the principal optical axis L, and is provided with the second beam splitting film. The second beam splitting film is configured to allow the visible light to penetrate through, and reflect the invisible light with a specific wavelength. The second beam splitting film may be provided on the second cemented plane 93 of the third prism 91 or the second cemented plane 93 of the fourth prism 92 in a manner including but not limited to coating.

The third plane 911 of the third prism 91 is perpendicular to the principal optical axis L of the sight, and provided on the focal plane B of the object side. When the visible light reaches the third plane 911 of the beam splitter prism set 90, namely the focal plane B of the object side, the visible light can form a clear inverted image. The inverted image can be corrected by the lens image inverter set as an erect target image on the imaging plane A, namely the first plane 611, and namely the focal plane of the eye side.

The fourth plane 921 of the fourth prism 92 is parallel to the principal optical axis L, and opposite to a receiving port of the laser receiver 22.

In view of this, the sight provided by the embodiment of the present application basically has the following working principle: The laser emitter 21 of the rangefinder assembly 20 emits invisible light with a specific wavelength to a target. The invisible light with the specific wavelength is reflected by the target, and enters the objective lens set 40 together with environment visible light.

Thereafter, the visible light passes through the objective lens set 40 along the principal optical axis L, enters the fourth prism 92, enters the third prism 91 through the second beam splitting film, and forms a clear inverted image on the third plane 911, namely the focal plane B of the object side. The visible light continues to pass through the image inverter set 50, and reaches the imaging plane A of the reticle set 60, namely the first plane 611 and namely the focal plane of the eye side, to form a clear erect image. The visible light continues to pass through the reflective film of the reticle set 60, and finally exits from the eyepiece set 70 to enter a human eye.

Meanwhile, the invisible light with the specific wavelength passes through the objective lens set 40 along the principal optical axis L, enters the fourth lens 92, is reflected by the second beam splitting film to the fourth plane 921, and is received by the laser receiver 22 opposite to the fourth plane 921. So far, in view of a time difference between emission of the invisible light with the specific wavelength from the laser emitter 21 to reception of the laser receiver 22, as well as a propagation velocity of the invisible light in air, the rangefinder assembly 20 can measure a distance from the target to the sight (or the shooter), and feed measured distance parameter information 31 back to the display screen 30 electrically connected to the rangefinder assembly 20. The display screen 30 displays the parameter information 31 including the distance to the second plane 621. Light emitted by the display screen 30 can be reflected to the eye side through the reflective film, and exits from the eyepiece set 70 together with the visible light to enter the human eye.

So far, the clear erect target image, the reticle pattern 612, and the parameter information 31 displayed by the display screen 30 can be observed in the full FOV by the human eye. This does not cause obstruction to the FOV, and particularly prevents the display screen 30 from obstructing the FOV. This ensures and improves a sighting clarity, a sighting accuracy, an FOV integrity, a sighting range and a sighting comfort, facilitates a sighting operation of the shooter, and particularly facilitates attention concentration, environment observation, as well as quick sighting in movement of the shooter.

Therefore, the sight provided by the embodiment is applied to the lens image-inverting optical system. While the full FOV is ensured, and more parameter information 31 is displayed as required, the invisible light with the specific wavelength is separated from the visible light through the beam splitter prism set 90 and the second beam splitting film, and the invisible light with the specific wavelength is deflected according to a preset path and emitted to the laser receiver 22. This can effectively shorten a propagation path of the invisible light with the specific wavelength, and can optimize a layout of the laser receiver 22 in the housing 10, thereby reducing the size of the sight, and facilitating miniaturization of the sight.

Referring to FIG. 7, in the embodiment, the laser receiver 22 is attached to the fourth plane 921. The third plane 911 and the fourth plane 921 are conjugated relative to the second cemented plane 93 of the third prism 91 and the fourth prism 92. That is, optical distances from any point on the second cemented plane 93 to the third plane 911 and the fourth plane 921 are the same. In other words, an optical distance from any point on the second cemented plane 93 to the third plane 911 is the same as an optical distance from the point to the fourth plane 921.

With the above solution, the optical distance of the invisible light with the specific wavelength from the fourth plane 921 of the fourth prism 92 to the laser receiver 22 is the same as the optical distance of the visible light from the fourth prism 92 to the third plane 911. Thus, the optical distance of the invisible light with the specific wavelength from the starting lens 41 of the objective lens set 40 to the laser receiver 22 is the same as the optical distance of the visible light from the starting lens 41 of the objective lens set 40 to the third plane 911, namely the focal plane B of the object side. While the visible light reaches the third plane 911, namely the focal plane B of the object side, and forms the inverted image, the invisible light with the specific wavelength can reach the laser receiver 22, and is focused at the receiving port of the laser receiver 22 for imaging. This can effectively improve an accuracy of the distance measured by the rangefinder assembly 20.

Embodiment 4

Figure 8:
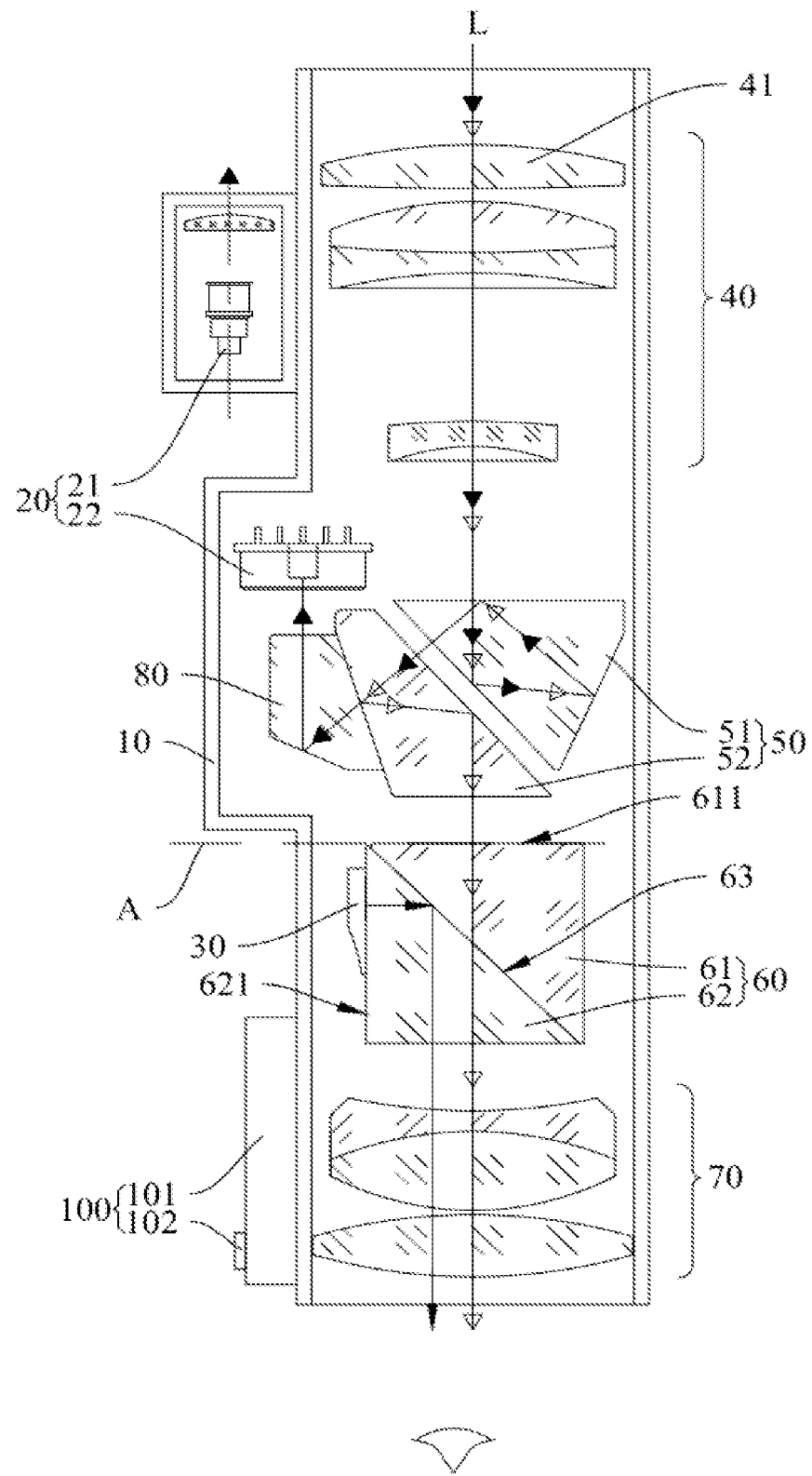
FIG. 8 is a structural schematic view of a sight according to Embodiment 4 of the present application.

Referring to FIG. 8, in the embodiment, the sight further includes battery compartment 100. The battery compartment 100 includes rechargeable battery 101 electrically connected to the rangefinder assembly 20 and the display screen 30, and charging interface 102 electrically connected to the rechargeable battery 101.

With the above solution, the sight can be connected to an external power supply through the charging interface 102 for energy storage of the rechargeable battery 101. During use, the rangefinder assembly 20 and the display screen 30 can be powered by the rechargeable battery 101, such that the rangefinder assembly 20 and the display screen 30 can be used without an external power supply.

Embodiment 5

Figure 9:
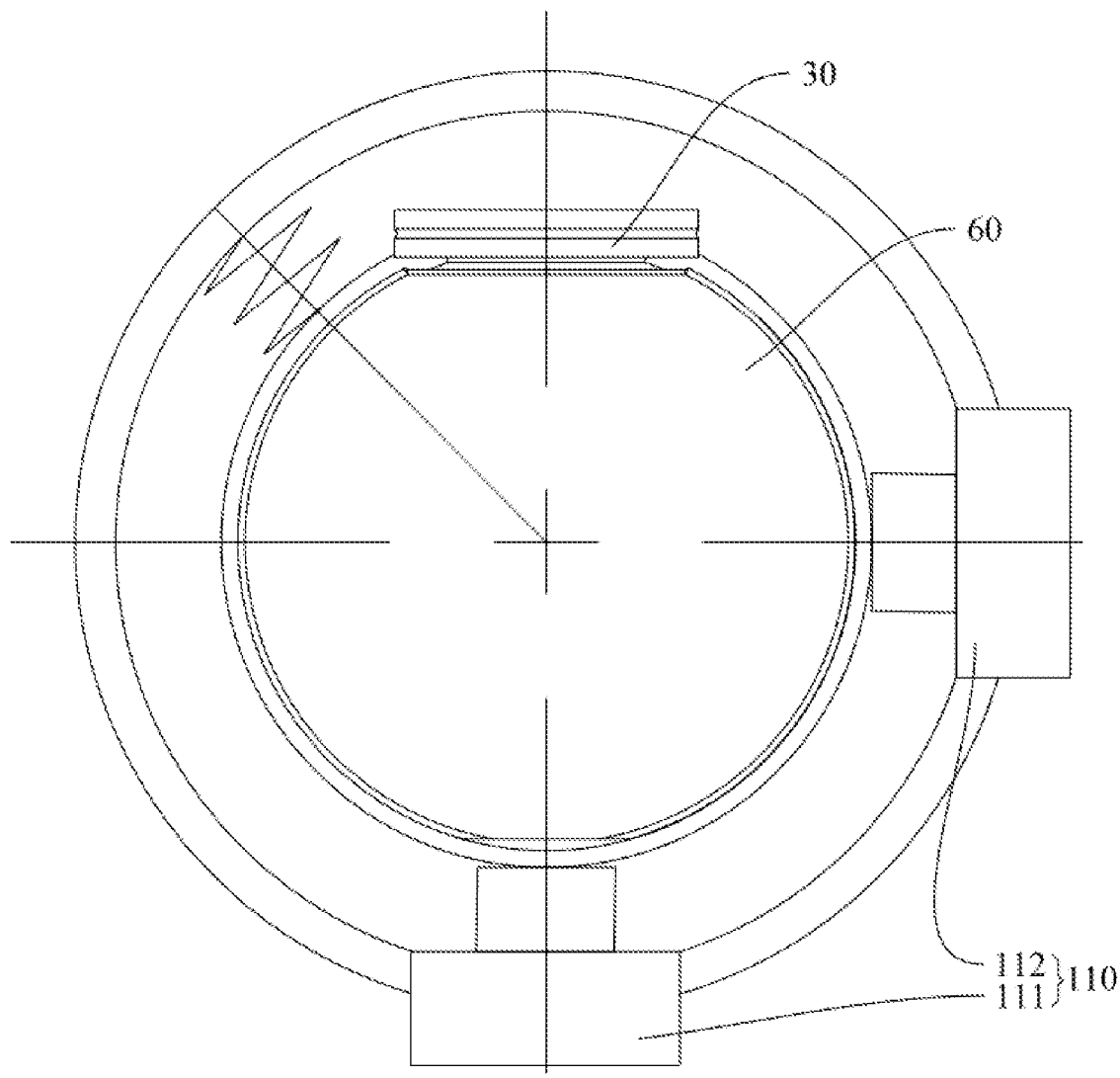
FIG. 9 is a schematic view illustrating cooperation between an internal adjustment mechanism and a reticle set according to Embodiment 5 of the present application.

Referring to FIG. 9, in the embodiment, the sight further includes internal adjustment mechanism 110. The internal adjustment mechanism 110 includes ballistic adjusting bolt 111 and airduct adjusting bolt 112 that are provided in the housing 10 in a penetration manner. The ballistic adjusting bolt 111 is provided at a side of the reticle set 60 along a vertical direction. The ballistic adjusting bolt 111 is configured to drive the reticle set 60 to move vertically, thereby adjusting a ballistic compensation distance. The airduct adjusting bolt 112 is provided at a side of the reticle set 60 along a horizontal direction. The airduct adjusting bolt 112 is configured to drive the reticle set 60 to move horizontally, thereby adjusting a windage compensation distance.

With the above solution, the ballistic adjusting bolt 111 drives the reticle set 60 to move vertically, thereby adjusting the ballistic compensation distance, and/or the airduct adjusting bolt 112 drives the reticle set 60 to move horizontally, thereby adjusting the windage compensation distance. Therefore, a reticle center is adjusted to a position coinciding with an impact point. The sight can be applied to more shooting distances and more air-velocity environments, with a high sighting accuracy.

Moreover, during adjustment, the first plane 611 of the reticle set 60 is maintained at the imaging plane A to ensure an imaging definition. Since the reticle set 60 does not change the path of the principal optical axis L, a parallax of the sight is not increased in the adjustment to ensure the sighting accuracy of the sight.

The ballistic adjusting bolt 111 is preferably provided at a side of the reticle set away from the display screen 30, so as not to damage the display screen 30.

Embodiment 6

The embodiment differs from Embodiment 5 in:

Referring to FIG. 1, in the embodiment, the sight further includes an external adjustment mechanism (not shown in the figure) provided outside the housing 10. The external adjustment mechanism includes a stand seat (not shown in the figure) engaged to a firearm guide rail, and a stand body (not shown in the figure) fixedly connected to the housing 10. The stand body is connected to the stand seat. The stand body can move vertically relative to the stand seat to adjust the ballistic compensation distance of the sight, and/or the stand body can move horizontally relative to the stand seat to adjust the windage compensation distance of the sight.

The stand body is connected to the stand seat through a connecting structure. Based on the connecting structure, the stand body can have a degree of freedom (DOF) to move vertically and horizontally relative to the stand seat. There are no limits made on specific implementation of the connecting structure.

With the above solution, the stand body and the sight can be driven to move vertically relative to the stand seat to adjust the ballistic compensation distance, and/or the stand body and the sight are driven to move horizontally relative to the stand seat to adjust the windage compensation distance. Therefore, a reticle center is adjusted to a position coinciding with an impact point. The sight can be applied to more shooting distances and more air-velocity environments, with a high sighting accuracy.

Embodiment 7

Figure 10:
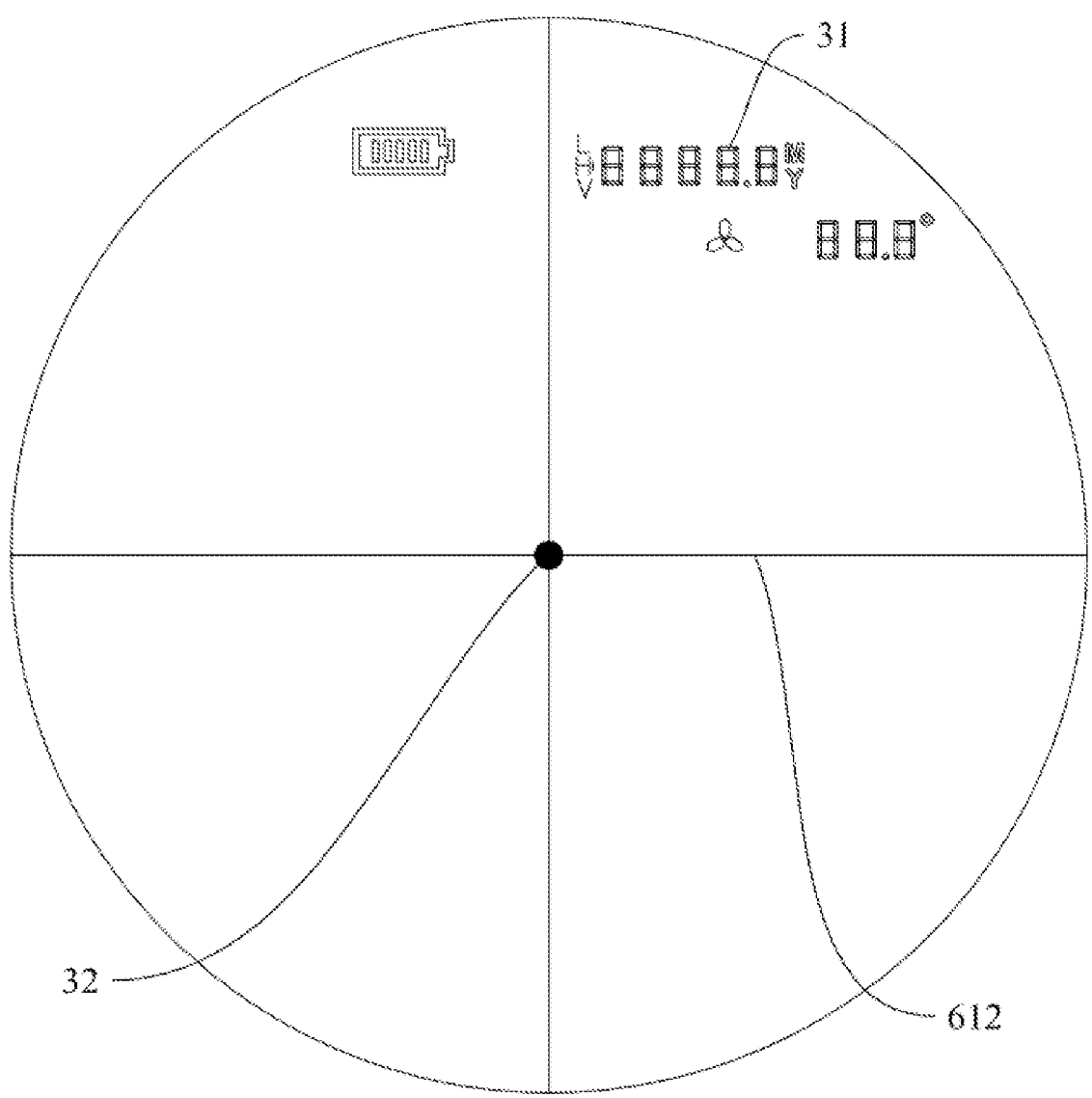
FIG. 10 is a first schematic view of an FOV according to Embodiment 7 of the present application, where a sighting point coincides with an FOV center.
Figure 11:
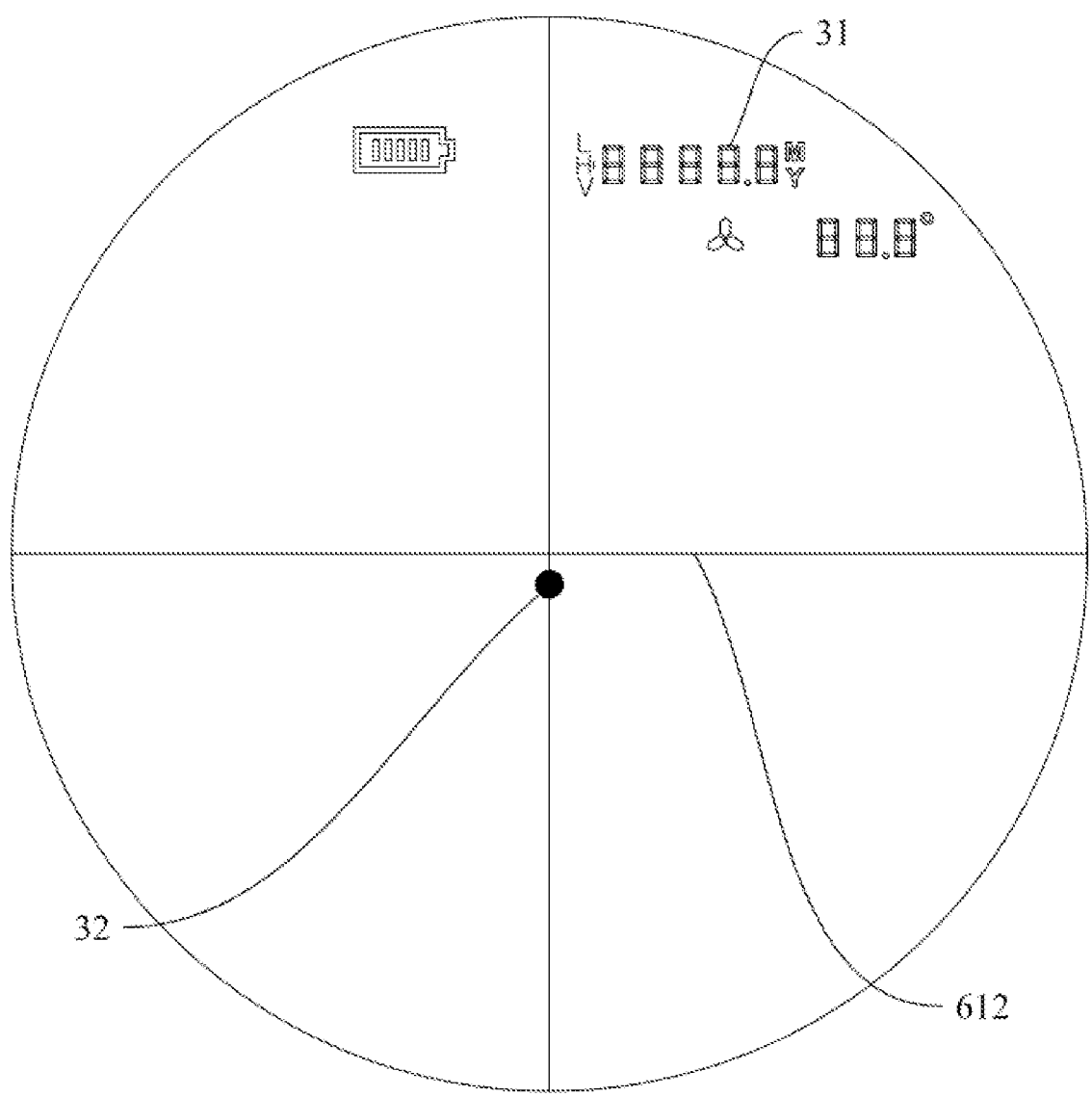
FIG. 11 is a second schematic view of an FOV according to Embodiment 7 of the present application, where a sighting point moves down relative to an FOV center.

The embodiment differs from Embodiment 5 and Embodiment 6 in:

Referring to FIG. 10, FIG. 11, and FIG. 1, in the embodiment, the display screen 30 displays sighting point 32, so as to indicate an adjusting position. That is, the display screen 30 directly displays the sighting point 32, so as to indicate a corresponding position to be adjusted.

Specifically, as shown in FIG. 10, assuming that a center point in an FOV of the sight is calibrated in advance according to a 100-m shooting distance, the sighting point 32 displayed by the display screen 30 coincides with a center point of the reticle pattern 612 and the FOV center. When the shooting distance is less than 100 m, the sighting point 32 displayed by the display screen 30 is fixed. Since close-distance shooting is still within a rectilinear orbit of a bullet, a shooting accuracy can also be ensured without adjusting the sighting point 32.

As shown in FIG. 11, when the shooting distance is greater than 100 m, the sighting point 32 displayed by the display screen 30 moves down automatically for a certain distance relative to the FOV center. In this case, the sighting point 32 displayed by the display screen 30 can be used for sighting to ensure a sighting accuracy under different shooting distances and/or air velocities. The center point of the reticle pattern 612 is unnecessarily adjusted through the ballistic adjusting bolt 111 in Embodiment 5 or a relevant structure for adjusting the ballistic compensation distance in Embodiment 6, thereby omitting manual adjustment for the reticle pattern 612. This is simple and convenient, and can simplify the structure of the sight.

Certainly, other shooting distances may also be used as a calibration distance, which is not limited in the embodiment. Exemplarily, assuming that the center point in the FOV of the sight is calibrated in advance according to a 300-m shooting distance, the sighting point 32 displayed by the display screen 30 coincides with the center point of the reticle pattern 612 and the FOV center. When the shooting distance is less than 300 m, the sighting point 32 displayed by the display screen 30 moves up automatically for a certain distance relative to the FOV center. Conversely, when the shooting distance is greater than 300 m, the sighting point 32 displayed by the display screen 30 moves down automatically for a certain distance relative to the FOV center. In this case, the sighting point 32 displayed by the display screen 30 can be used for sighting to ensure a sighting accuracy under different shooting distances and/or air velocities. The center point of the reticle pattern 612 is unnecessarily adjusted through the ballistic adjusting bolt 111 in Embodiment 5 or a relevant structure for adjusting the ballistic compensation distance in Embodiment 6, thereby omitting manual adjustment for the reticle pattern 612. This is simple and convenient, and can simplify the structure of the sight.

Whether the sighting point 32 displayed by the display screen 30 moves up or down automatically for a certain distance relative to the FOV center is automatically determined by the MCU according to the parameter information 31 such as a ranging result of the rangefinder assembly 20 as well as an impact point, without manual intervention.

The sighting point 32 displayed by the display screen 30 is a flickering bright point (such as a red point), so as to make the sighting point 32 displayed by the display screen 30 more obvious and bright.

Certainly, beside the sighting point 32, the display screen 30 may further display more parameter information 31, for example, the parameter information 31 including a distance, a battery level, a temperature, and an air velocity.

The above described are merely preferred embodiments of the present application, and are not intended to limit the present application. Any modification, equivalent substitution, improvement, and the like without departing from the spirit and principle of the present application should fall within the protection scope of the present application.

What is claimed is:

1. A sight, comprising:
   a housing,
   a rangefinder assembly,
   a display screen provided in the housing and electrically connected to the rangefinder assembly,
   an objective lens set,
   an image inverter set,
   a reticle set, and
   an eyepiece set provided in the housing and sequentially arranged from an object side to an eye side,
   wherein the reticle set comprises a first prism and a second prism cemented to each other; a reflective film is provided on a first cemented plane of the first prism and the second prism; the first prism has a first plane provided on an imaging plane; the second prism has a second plane perpendicular to the first plane; the first plane is provided with a reticle pattern; a light-emitting plane of the display screen is attached to the second plane; and the reflective film is configured to reflect light from the display screen to the eye side.

2. The sight according to claim 1, wherein the first plane and the second plane are conjugated relative to the first cemented plane of the first prism and the second prism.

3. The sight according to claim 1, wherein the image inverter set is a prism image inverter set; the image inverter set comprises a roof prism and a half-pentaprism; the roof prism has a first incident plane, a first reflecting plane, and a first exit plane; the half-pentaprism has a second incident plane, a second reflecting plane, and a second exit plane; the first incident plane faces to the object side; the first exit plane is opposite to the second incident plane; and the second exit plane faces to the eye side.

4. The sight according to claim 3, wherein the sight further comprises a beam splitter prism; the beam splitter prism has a third incident plane, a third reflecting plane, and a third exit plane; the third incident plane is attached to the second reflecting plane; the second reflecting plane or the third incident plane is provided with a first beam splitting film; and the first beam splitting film is configured to reflect visible light and allow invisible light to penetrate through; and
   the rangefinder assembly comprises a laser emitter provided outside the housing, and a laser receiver provided in the housing; and the laser receiver is opposite to the third exit plane.

5. The sight according to claim 4, wherein the objective lens set comprises a starting lens closest to the object side; and an optical distance from the starting lens to the laser receiver is the same as an optical distance from the starting lens to the first plane.

6. The sight according to claim 4, wherein at least one of the first incident plane, the first exit plane, the second incident plane, the second exit plane, and the third exit plane is provided with an anti-reflective film.

7. The sight according to claim 1, wherein the image inverter set is a lens image inverter set;
   the sight further comprises a beam splitter prism set provided between the image inverter set and the objective lens set; the beam splitter prism set comprises a third prism and a fourth prism cemented to each other; a second beam splitting film is provided on a second cemented plane of the third prism and the fourth prism; the third prism has a third plane provided on a focal plane of the object side; the fourth prism has a fourth plane perpendicular to the third plane; and the second beam splitting film is configured to allow visible light to penetrate through and reflect invisible light to the fourth plane; and the rangefinder assembly comprises a laser emitter provided outside the housing, and a laser receiver provided in the housing; and the laser receiver is opposite to the fourth plane.

8. The sight according to claim 7, wherein the laser receiver is attached to the fourth plane; and the third plane and the fourth plane are conjugated relative to the second cemented plane of the third prism and the fourth prism.

9. The sight according to claim 1, wherein the sight further comprises a control panel electrically connected to the display screen; a button is provided on the control panel; and the button is exposed out of the housing; and/or the sight further comprises a battery compartment; and the battery compartment comprises a rechargeable battery electrically connected to the rangefinder assembly and the display screen, and a charging interface electrically connected to the rechargeable battery.

10. The sight according to claim 1, wherein the sight further comprises an internal adjustment mechanism; the internal adjustment mechanism comprises a ballistic adjusting bolt and an airduct adjusting bolt that are provided in the housing in a penetration manner; the ballistic adjusting bolt is provided at a side of the reticle set along a vertical direction; the ballistic adjusting bolt is configured to drive the reticle set to move vertically, thereby adjusting a ballistic compensation distance; the airduct adjusting bolt is provided at a side of the reticle set along a horizontal direction; and the airduct adjusting bolt is configured to drive the reticle set to move horizontally, thereby adjusting a windage compensation distance;

the sight further comprises an external adjustment mechanism provided outside the housing; the external adjustment mechanism comprises a stand seat engaged to a firearm guide rail, and a stand body fixedly connected to the housing; the stand body is connected to the stand seat; the stand body is capable of moving vertically relative to the stand seat to adjust the ballistic compensation distance of the sight; and/or the stand body is capable of moving horizontally relative to the stand seat to adjust the windage compensation distance of the sight; or the display screen displays a sighting point to indicate an adjusting position.

* * * * *